United States Patent
Padebettu

(10) Patent No.: US 11,575,649 B2
(45) Date of Patent: Feb. 7, 2023

(54) SUPPORTING DYNAMIC HOST CONFIGURATION PROTOCOL-BASED CUSTOMER PREMISES EQUIPMENT IN FIFTH GENERATION WIRELINE AND WIRELESS CONVERGENCE

(71) Applicant: Juniper Networks, Inc., Sunnyvale, CA (US)

(72) Inventor: Venkatesh Padebettu, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 156 days.

(21) Appl. No.: 17/248,459

(22) Filed: Jan. 26, 2021

(65) Prior Publication Data

US 2022/0141176 A1    May 5, 2022

(30) Foreign Application Priority Data

Oct. 29, 2020 (IN) .............................. 202041047196

(51) Int. Cl.
*H04L 61/5014* (2022.01)
*H04W 76/12* (2018.01)
(Continued)

(52) U.S. Cl.
CPC ........ *H04L 61/5014* (2022.05); *H04L 61/103* (2013.01); *H04L 67/142* (2013.01); *H04W 76/12* (2018.02); *H04L 2101/659* (2022.05)

(58) Field of Classification Search
CPC . H04L 61/5014; H04L 61/103; H04L 67/142; H04L 2101/659; H04L 67/141;
(Continued)

(56) References Cited

U.S. PATENT DOCUMENTS 11,234,057 B2 * 1/2022 Lee .................. H04N 21/8166
2020/0128087 A1 * 4/2020 Yu .......................... H04M 7/126
(Continued)

OTHER PUBLICATIONS

Technical Specification Group Services and System Aspects; Study on the Wireless and Wireline Convergence for the 5G system architecture; 3GPP TR 23.716 V1.1.0, Oct. 2018. (Year: 2018).*
(Continued)

*Primary Examiner* — Tejis Daya
(74) *Attorney, Agent, or Firm* — Harrity & Harrity, LLP

(57) ABSTRACT

A device may receive, from a first network device, an authentication request that requests authentication of the device, and may provide, to the first network device, an authentication response that includes the authentication of the device. The device may provide, to the first network device and based on the authentication response, a PDU session establishment request that requests establishment of a PDU session for customer premises equipment, and may receive, from the first network device and based on the PDU session establishment request, a PDU session resource setup request that requests a resource to be established for the PDU session. The device may provide, to the first network device and based on the PDU session resource setup request, a PDU session resource setup response indicating that the resource is a GTP tunnel, and may establish the GTP tunnel with a second network device.

20 Claims, 9 Drawing Sheets

(51) Int. Cl.
*H04L 67/142* (2022.01)
*H04L 61/103* (2022.01)
*H04L 101/659* (2022.01)

(58) Field of Classification Search
CPC .. H04L 2101/622; H04W 76/12; H04W 76/11
See application file for complete search history.

(56) References Cited

U.S. PATENT DOCUMENTS

2020/0329514 A1* 10/2020 Yu ........................... H04W 8/02
2021/0168661 A1* 6/2021 Wong ................... H04L 63/123

OTHER PUBLICATIONS

3GPP, "3rd Generation Partnership Project; Technical Specification Group Services and System Aspects; Wireless and Wireline Convergence Access Support for the 5G System (Release 16)," 3GPP Standard; 3GPP TS23.316; 3rd Generation Partnership Project (3GPP), Mobile Competence Centre; 650, Route Des, Lucioles; F-06921 Sophia-Antipolis Cedex; France, No. V16.5.0, Sep. 2020, pp. 1-83, XP051960888, [retrieved on Mar. 27, 2020], Retrieved from the Internet: [URL:http://ftp.3gpp.org/Specs/archive/23_series/23.316/23316-g50.zip] 23316-g50.docx.

Broadband Forum., "TR-456 AGF Functional Requirements," 3GPP Draft; S2-2006795, 3rd Generation Partnership Project (3GPP), Mobile Competence Centre; 650, Route Des, Lucioles; F-06921 Sophia-Antipolis Cedex; France, Sep. 2020, 111 pages, XP051935382, [retrieved on Sep. 22, 2020] Retrieved from the Internet: URL: [https://ftp.3gpp.org/tsg_sa/WG2_Arch/TSGS2_141e_Electronic/Docs/S2-2006795.zip] TR-456 Final Ballot.pdf.

Ericsson: "Support for Bridged RGs and IPv4 Subnets Behind the RG," 3GPP Draft, S2-1906280_WAS6246_WAS5006_5WWC_23316_BRIDGED_RG, 3rd Generation Partnership Project (3GPP), Mobile Competence Centre; 650, Route Des, Lucioles; F-06921 Sophia-Antipolis Cedex; France, vol. SA WG2. No. Reno. NV. USA, May 17, 2019, 5 pages, XP051736207, [retrieved on May 17, 2019] Retrieved from the Internet: [URL:http://www.3gpp.org/ftp/Meetings%5F3GPP%5FSYNC/SA2/Docs/S2%2D1906280%2Ezip].

Extended European Search Report for Application No. EP21163828.3, dated Sep. 10, 2021, 11 pages.

Wan et al., "Authentication in 5G Wireline and Wireless Convergence," 2019 Fall Technical Forum, New Orleans, LA, Sep. 30, 2019, 10 pages, XP055836951, [retrieved on Sep. 1, 2021] Retrieved from the Internet: URL:[https://www.nctatechnicalpapers.com/Paper/2019/2019-authentication-in-5g-wireline-and-wireless-convergence-2/download].

* cited by examiner

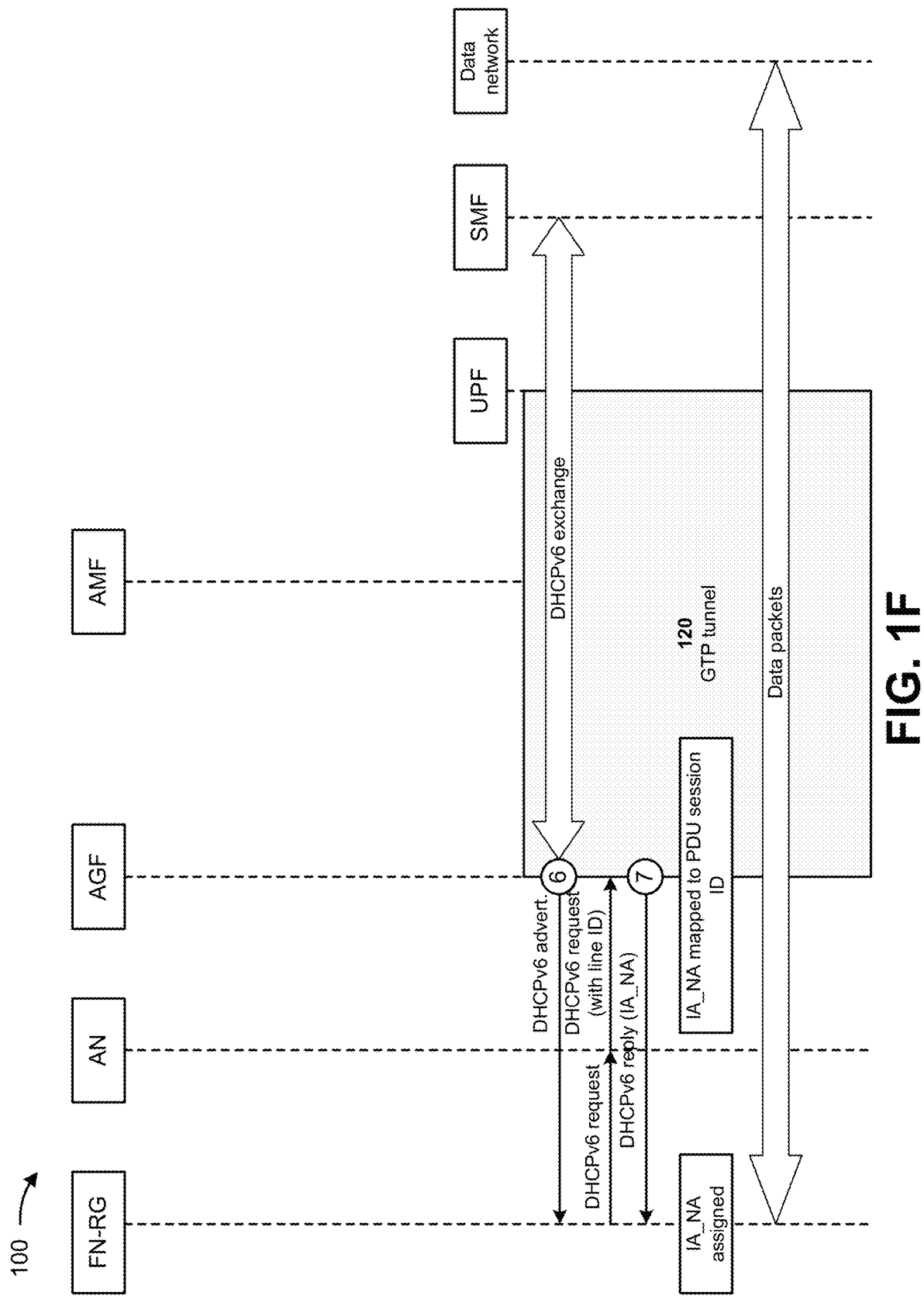

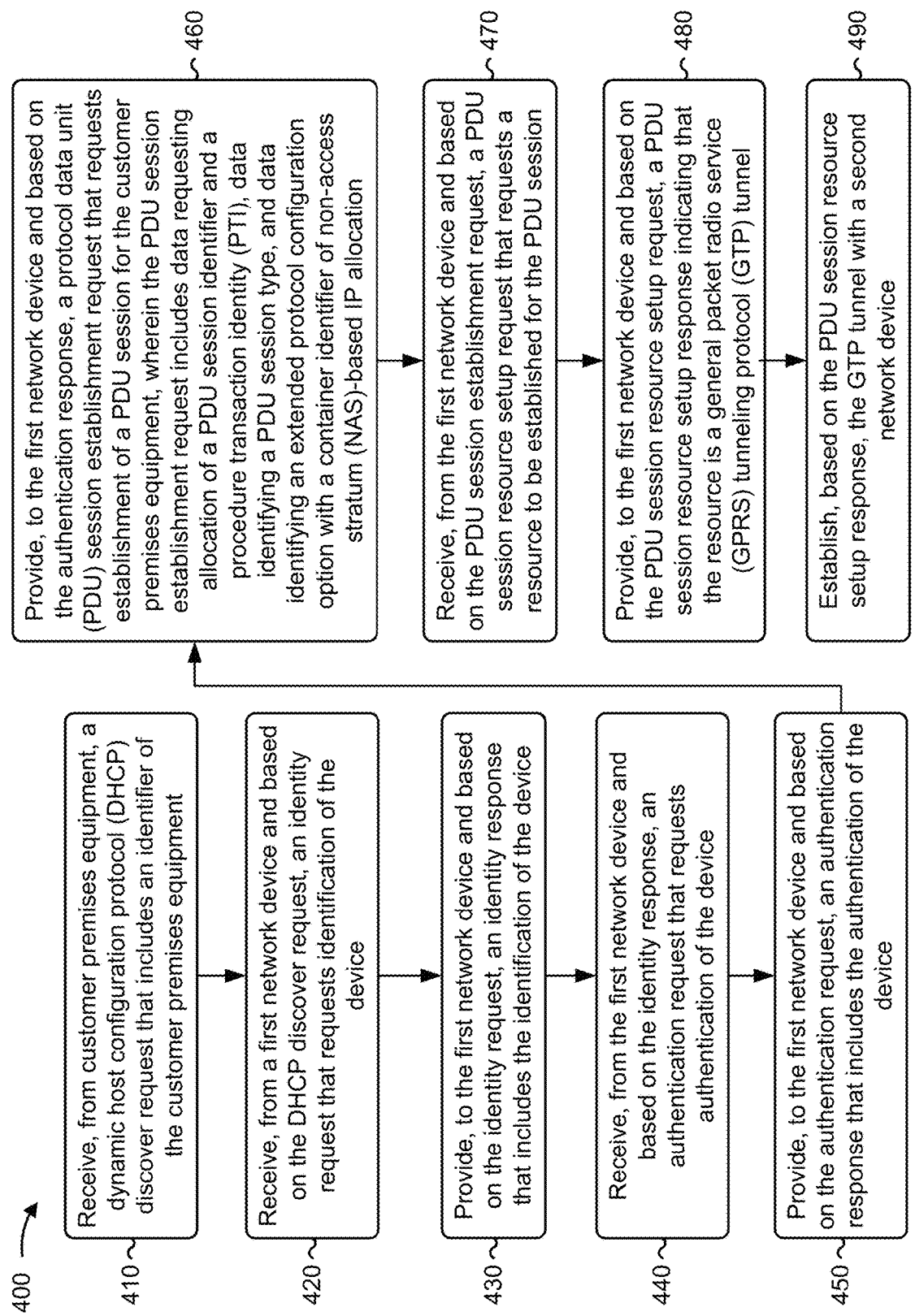

SUPPORTING DYNAMIC HOST CONFIGURATION PROTOCOL-BASED CUSTOMER PREMISES EQUIPMENT IN FIFTH GENERATION WIRELINE AND WIRELESS CONVERGENCE

CROSS-REFERENCE TO RELATED APPLICATION

This application claims priority to Indian Provisional Application No. 202041047196 entitled "SUPPORTING DYNAMIC HOST CONFIGURATION PROTOCOL-BASED CUSTOMER PREMISES EQUIPMENT IN FIFTH GENERATION WIRELINE AND WIRELESS CONVERGENCE," filed on Oct. 29, 2020. The entire content of which is expressly incorporated herein by reference.

BACKGROUND

The dynamic host configuration protocol (DHCP) is a network management protocol used on Internet protocol (IP) networks, whereby a DHCP server dynamically assigns an IP address and other network configuration parameters to each device of the network, so that each device can communicate with other IP networks.

SUMMARY

In some implementations, a method includes receiving, from customer premises equipment, a dynamic host configuration protocol (DHCP) discover request that includes an identifier of the customer premises equipment, and receiving, from a first network device and based on the DHCP discover request, an identity request that requests identification of the device. The method may include providing, to the first network device and based on the identity request, an identity response that includes the identification of the device, and receiving, from the first network device and based on the identity response, an authentication request that requests authentication of the device. The method may include providing, to the first network device and based on the authentication request, an authentication response that includes the authentication of the device, and providing, to the first network device and based on the authentication response, a protocol data unit (PDU) session establishment request that requests establishment of a PDU session for the customer premises equipment. The PDU session establishment request may include data requesting allocation of a PDU session identifier and a procedure transaction identity (PTI), data identifying a PDU session type, and data identifying an extended protocol configuration option with a container identifier of non-access stratum-based IP allocation. The method may include receiving, from the first network device and based on the PDU session establishment request, a PDU session resource setup request that requests a resource to be established for the PDU session, and providing, to the first network device and based on the PDU session resource setup request, a PDU session resource setup response indicating that the resource is a general packet radio service (GPRS) tunneling protocol (GTP) tunnel. The method may include establishing, based on the PDU session resource setup response, the GTP tunnel with a second network device.

In some implementations, a device includes one or more memories, and one or more processors to receive, from customer premises equipment, a dynamic host configuration protocol (DHCP) discover request that includes an identifier of the customer premises equipment, and receive, from a first network device and based on the DHCP discover request, an identity request that requests identification of the device. The one or more processors may provide, to the first network device and based on the identity request, an identity response that includes the identification of the device, and may receive, from the first network device and based on the identity response, an authentication request that requests authentication of the device. The one or more processors may provide, to the first network device and based on the authentication request, an authentication response that includes the authentication of the device, and may provide, to the first network device and based on the authentication response, a protocol data unit (PDU) session establishment request that requests establishment of a PDU session for the customer premises equipment. The PDU session establishment request may include data requesting allocation of a PDU session identifier and a procedure transaction identity (PTI), data identifying a PDU session type, and data identifying an extended protocol configuration option with a container identifier of non-access stratum-based IP allocation. The one or more processors may receive, from the first network device and based on the PDU session establishment request, a PDU session resource setup request that requests a resource to be established for the PDU session, and may provide, to the first network device and based on the PDU session resource setup request, a PDU session resource setup response indicating that the resource is a general packet radio service (GPRS) tunneling protocol (GTP) tunnel. The one or more processors may establish, based on the PDU session resource setup response, the GTP tunnel with a second network device, and may enable data packets to be provided from the customer premises equipment to a data network via the GTP tunnel.

In some implementations, a non-transitory computer-readable medium may store a set of instructions that includes one or more instructions that, when executed by one or more processors of a device, cause the device to receive, from a first network device and based on a dynamic host configuration protocol (DHCP) discover request received from customer premises equipment, an identity request that requests identification of the device, and provide, to the first network device and based on the identity request, an identity response that includes the identification of the device. The one or more instructions may cause the device to receive, from the first network device and based on the identity response, an authentication request that requests authentication of the device, and provide, to the first network device and based on the authentication request, an authentication response that includes the authentication of the device. The one or more instructions may cause the device to provide, to the first network device and based on the authentication response, a protocol data unit (PDU) session establishment request that requests establishment of a PDU session for the customer premises equipment. The PDU session establishment request may include data requesting allocation of a PDU session identifier and a procedure transaction identity (PTI), data identifying a PDU session type, and data identifying an extended protocol configuration option with a container identifier of non-access stratum-based IP allocation. The one or more instructions may cause the device to receive, from the first network device and based on the PDU session establishment request, a PDU session resource setup request that requests a resource to be established for the PDU session, and provide, to the first network device and based on the PDU session resource setup request, a PDU session resource setup response indicating that the resource is a general packet radio service (GPRS) tunneling protocol (GTP) tunnel. The one or more instructions may cause the device to establish, based on the PDU session resource setup response, the GTP tunnel with a second network device.

BRIEF DESCRIPTION OF THE DRAWINGS

FIGS. 1A-1F are diagrams of an example implementation described herein.

FIG. 4 is a flowchart of an example process for supporting DHCP-based customer premises equipment in fifth generation (5G) wireline and wireless convergence.

DETAILED DESCRIPTION

Figure 1A:
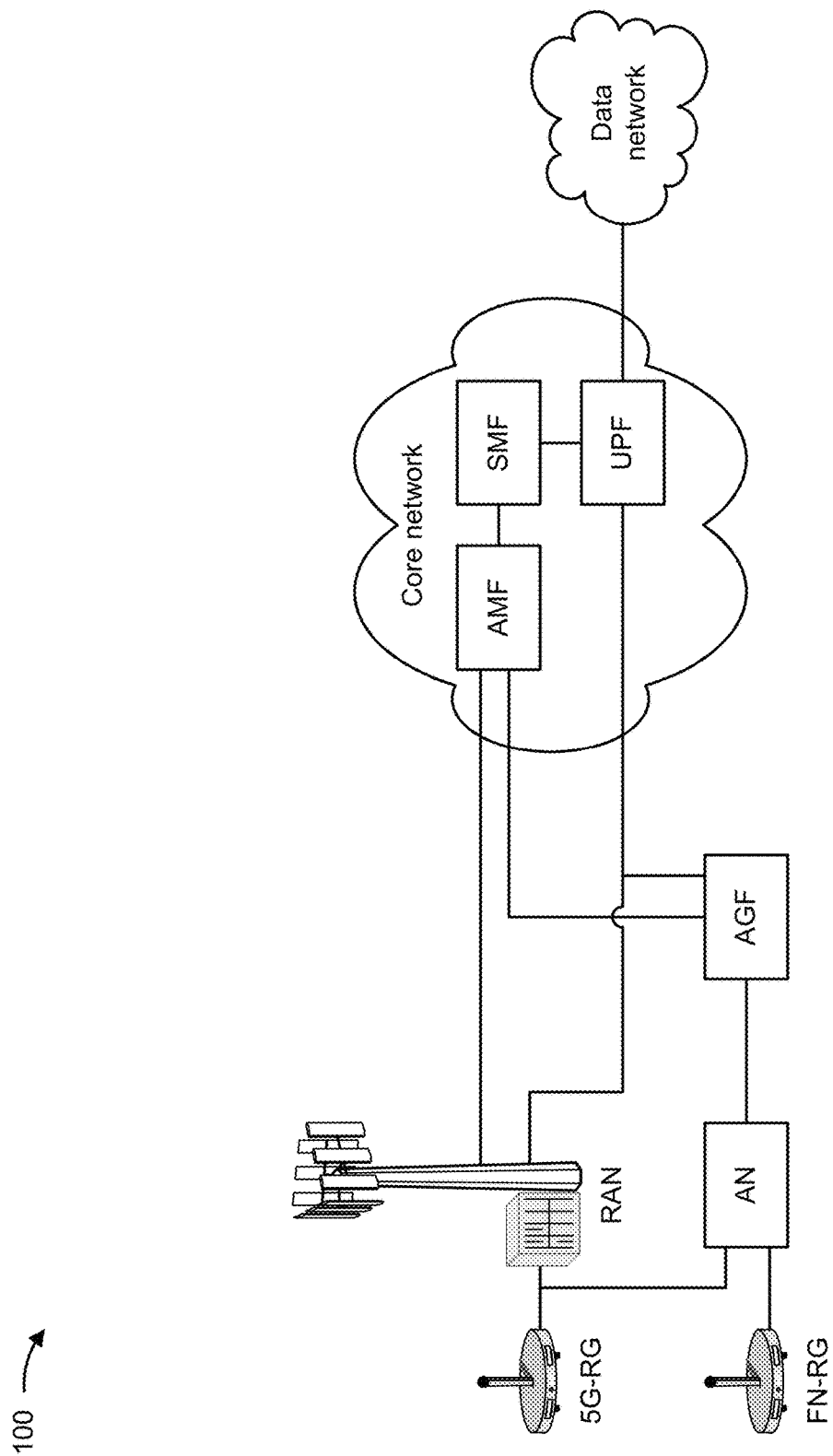

The following detailed description of example implementations refers to the accompanying drawings. The same reference numbers in different drawings may identify the same or similar elements.

An access gateway function (AGF) acts as a DHCP relay to support subscriber IP address and network parameters management for legacy DHCP based customer premises equipment (CPE), such as a fixed network cable residential gateway (FN-RG). This requires the access gateway function to use a method called IP address allocation using DHCP (e.g., an extended protocol configuration option (ePCO) with a container identifier (ID) of "0x000B [DHCPv4 based IP allocation]"). This forces the access gateway function to be a stateful DHCP relay for the FN-RG. Instead of the 5G control plane (5GCP) providing the IP address and other network parameters, such as a gateway IP, a domain name system (DNS) IP, and/or the like, via non-access stratum (NAS) signaling, now the 5GCP has to support the DHCP server which supports the DHCP relay (e.g., the access gateway function acting as a DHCP relay). However, such support does not exist today in the 5GCP.

Furthermore, the DHCP control packets from the FN-RG have to be carried over a pre-established (e.g., per CPE) general packet radio service (GPRS) tunneling protocol (GTP) tunnel that terminates on a user plane function (UPF) and needs to be sent to the 5GCP via another GTP tunnel. This causes a large overhead in the control path, due to multiple encapsulations and decapsulations. Since a resource lease is very large, a maximum value, and/or infinite, resources allocated in a data path have to be reserved for a lifetime of the FN-RG. Additional protocols, such as the bidirectional forwarding detection (BFD) protocol, can be used for liveliness detection, but fails to scale for large quantity of CPE (e.g., more than 200,000 CPE).

The aforementioned causes DHCP packets to be transmitted to a session management function (SMF), via a UPF in the GTP tunnel. This introduces additional deep packet inspection in the access gateway to identify DHCP control packets inside the GTP tunnel (e.g., a user datagram protocol (UDP)-based tunnel). Also, additional DHCP packets for renewal and release need to be transmitted to the SMF via the UPF. The access gateway function has to perform encapsulation in an upstream direction and decapsulation on a downstream direction for the additional DHCP packets. Thus, the current configuration of the access gateway function adds a large quantity of overhead in the access gateway function and a large quantity of packets to be carried to and from the SMF, via the UPF, using the GTP tunnel. This, in turn, wastes computing resources (e.g., processing resources, memory resources, communication resources, and/or the like), networking resources, and/or the like associated with performing deep packet inspection, transmitting DHCP packets to the SMF via the UPF, encapsulating and/or decapsulating DHCP packets, and/or the like.

Some implementations described herein relate to an AGF that supports DHCP-based customer premises equipment in 5G wireline and wireless convergence. For example, the AGF may receive, from customer premises equipment, a DHCP discover request that includes an identifier of the customer premises equipment, and may receive, from a first network device and based on the DHCP discover request, an identity request that requests identification of the AGF. The AGF may provide, to the first network device and based on the identity request, an identity response that includes the identification of the AGF, and may receive, from the first network device and based on the identity response, an authentication request that requests authentication of the AGF. The AGF may provide, to the first network device and based on the authentication request, an authentication response that includes the authentication of the AGF, and may provide, to the first network device and based on the authentication response, a protocol data unit (PDU) session establishment request that requests establishment of a PDU session for the customer premises equipment. The PDU session establishment request may include data requesting allocation of a PDU session identifier and a procedure transaction identity (PTI), data identifying a PDU session type, and data identifying an extended protocol configuration option with a container identifier of NAS-based IP allocation. The AGF may receive, from the first network device and based on the PDU session establishment request, a PDU session resource setup request that requests a resource to be established for the PDU session, and may provide, to the first network device and based on the PDU session resource setup request, a PDU session resource setup response indicating that the resource is a general packet radio service (GPRS) tunneling protocol (GTP) tunnel. The AGF may establish, based on the PDU session resource setup response, the GTP tunnel with a second network device.

In this way, the AGF supports DHCP-based customer premises equipment in 5G wireline and wireless convergence. The AGF may reduce overhead both in the AGF and a network provided between the AGF and the SMF (e.g., via the UPF). The AGF may establish and utilize a NAS signaling method for allocation of an IP address for the FN-RG and may serve the FN-RG with the IP address and network parameters allocated by the 5GCP. In addition, a lease time for the IP address may be configurable to a short duration. This, in turn, conserves computing resources, networking resources, and/or the like that would otherwise have been wasted in performing deep packet inspection, transmitting DHCP packets to the SMF via the UPF, encapsulating and/or decapsulating DHCP packets, and/or the like.

FIGS. 1A-1F are diagrams of an example 100 associated with supporting DHCP-based customer premises equipment in 5G wireline and wireless convergence. As shown in FIGS. 1A-1F, example 100 includes customer premises equipment, such as a 5G residential gateway (5G-RG) and an FN-RG; a radio access network (RAN); an access node (AN); an AGF; a core network that includes an access and mobility management function (AMF), a SMF, and a UPF; and a data network. The 5G-RG may include a device that combines a 5G modem and a Wi-Fi router into a single device. The FN-RG may include a network device (e.g., a router) that provides network access between local area network (LAN) hosts to a wide area network (WAN) (e.g., the Internet) via a modem.

The RAN may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for 5G-RG 205.

The AN may include a network device (e.g., a switch) that is located at a meeting point between two networks (e.g., a customer premises LAN and core network 230). The AGF may include a device that supports DHCP-based customer premises equipment in 5G wireline and wireless convergence. The core network may include an example architecture of a 5G next generation (NG) core network included in a 5G wireless telecommunications system. The AMF may include one or more devices that act as a termination point for NAS signaling, mobility management, and/or the like. The SMF may include one or more devices that support the establishment, modification, and release of communication sessions in the wireless telecommunications system. The UPF may include one or more devices that serve as an anchor point for intraRAT and/or interRAT mobility. The data network may include one or more wired and/or wireless data networks.

As shown in FIG. 1A, the AN may connect to the 5G-RG, the FN-RG, and the AGF; the RAN may connect to the AMF and the UPF; the AGF may connect to the AN and the AMF; the AMF may connect to the RAN, the AGF, and the SMF; the SMF may connect to the AMF and the UPF; and the UPF may connect to the SMF and the data network.

Figure 1B:
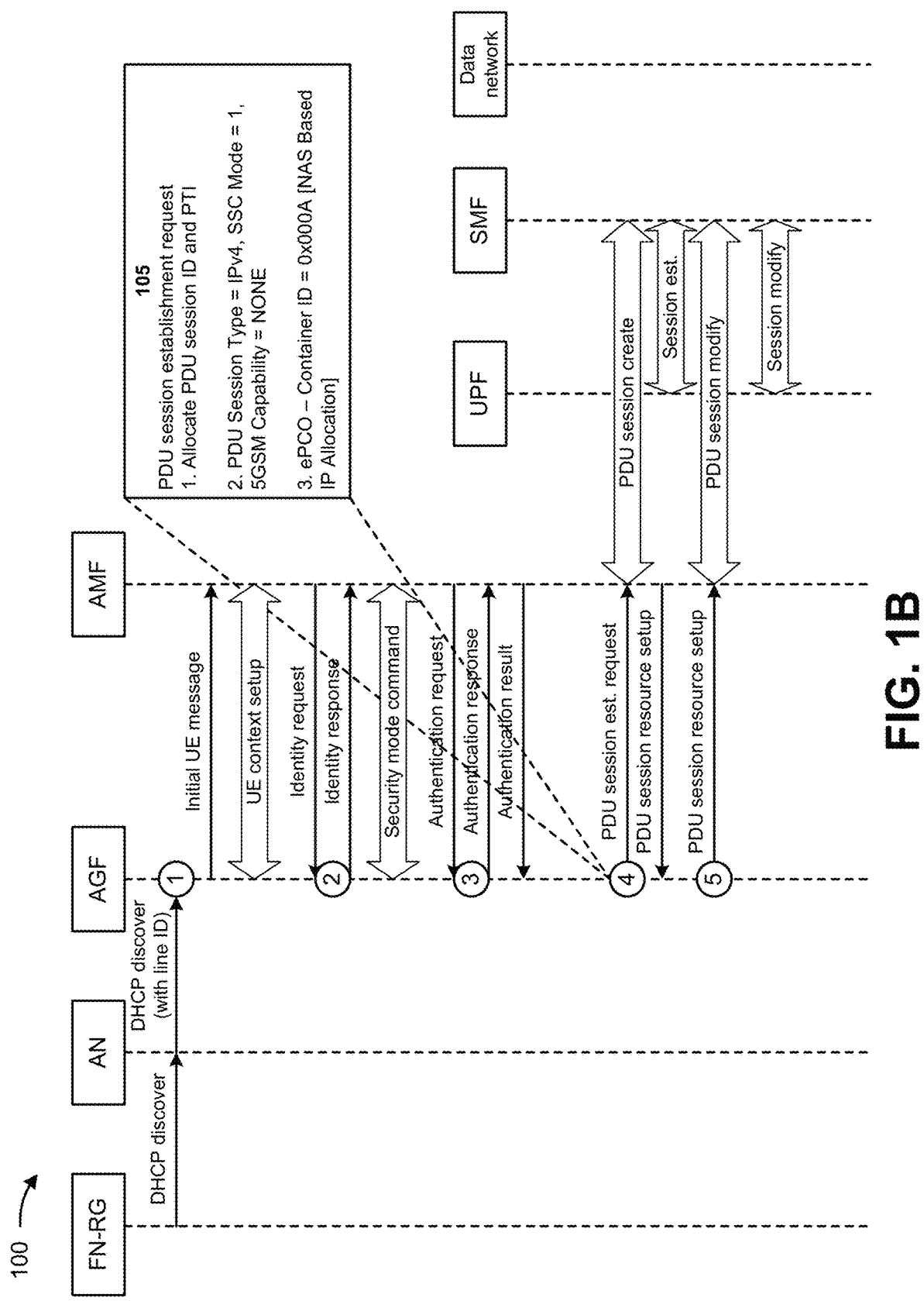
Figure 1C:
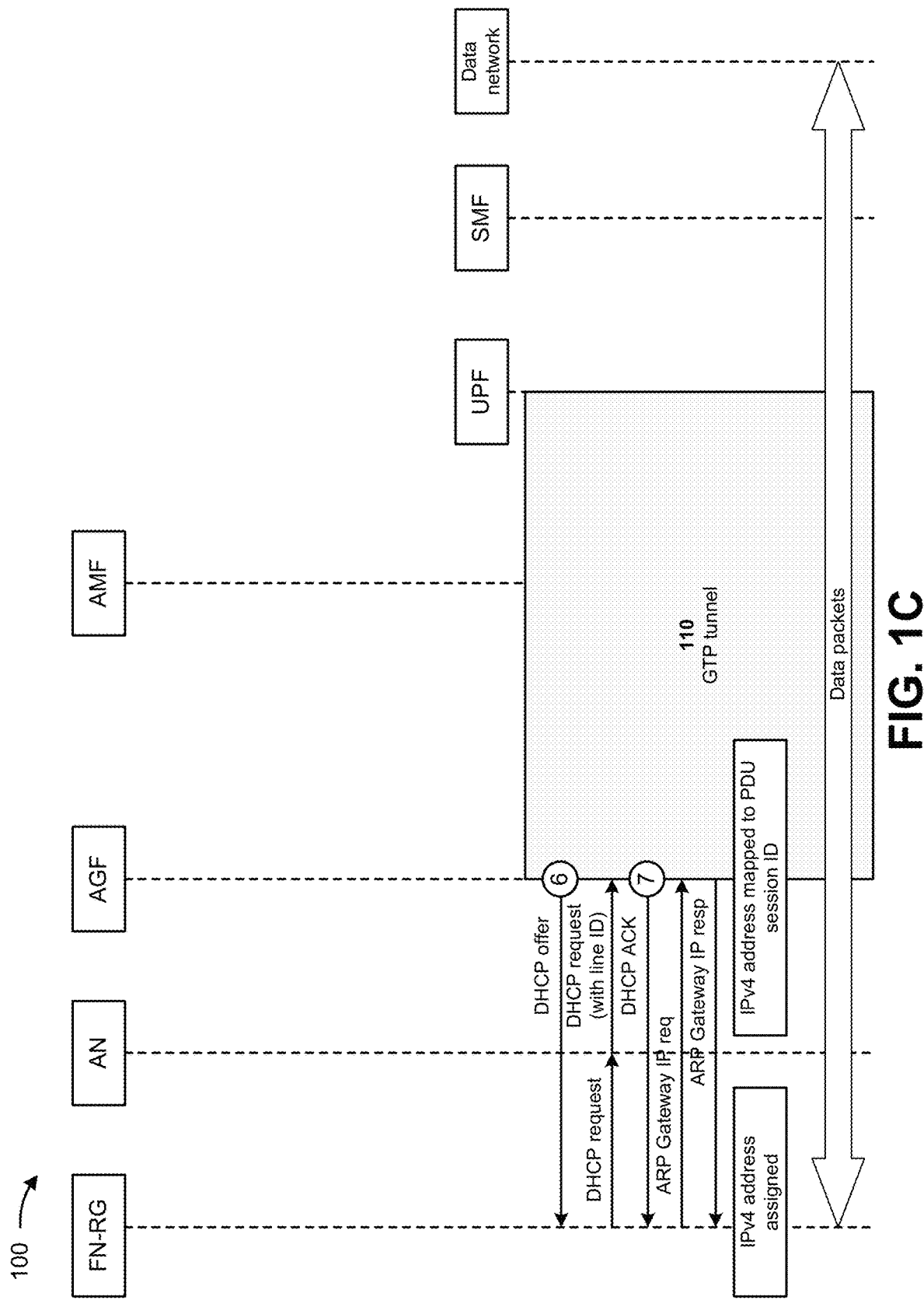

FIGS. 1B and 1C depict a call flow diagram for an Internet protocol version 4 packet flow. As shown in FIG. 1B, the FN-RG may generate a DHCP discover request that requests identification of a DHCP server (e.g., the AGF), and may provide the DHCP discover request to the AN. The AN may append an identifier of the FN-RG (e.g., a line ID) to the DHCP discover request, and may provide the DHCP discover request to the AGF. As indicated by step number 1, the AGF may receive, from the AN, the DHCP discover request that includes the identifier of the FN-RG. The AGF may provide, to the AMF and based on the DHCP discover request, an initial user equipment (UE) message that requests registration of the AGF. As further shown, the AGF and the AMF may perform UE context setup to aid in the registration of the AGF.

As indicated by step number 2, the AGF may receive, from the AMF and based on the DHCP discover request, an identity request that requests identification of the AGF. As further indicated by step number 2, the AGF may provide, to the AMF and based on the identity request, an identity response that includes the identification of the AGF. The identification of the AGF may include a network address associated with the AGF. The AGF and the AMF may utilize security mode commands to aid in the registration of the AGF.

As indicated by step number 3, the AGF may receive, from the AMF and based on the identity response, an authentication request that requests authentication of the AGF. As further indicated by step number 3, the AGF may provide, to the AMF and based on the authentication request, an authentication response that includes the authentication of AGF. The AMF may receive the authentication response and may determine whether to authenticate the AGF. If the AMF authenticates the AGF, the AMF may provide, to the AGF, an authentication result indicating that the AGF is authenticated.

As indicated by step number 4, the AGF may provide, to the AMF and based on the authentication response and/or the registration complete message, a PDU session establishment request that requests establishment of a PDU session for the FN-RG. For example, as indicated by reference number 105, the PDU session establishment request may include data requesting allocation of a PDU session identifier and a procedure transaction identity (PTI) (e.g., an identity that is allocated for PDU session establishment, modification, and release procedures); data identifying a PDU session type (e.g., IP version 4, with a session and service continuity (SSC) mode, and no 5GSM capability); data identifying an extended protocol configuration option (ePCO) with a container identifier (e.g., "0x000A") of a NAS-based IP allocation; and/or the like.

As further shown in FIG. 1B, the AMF may request that the SMF create the PDU session, and the UPF and the SMF may establish the PDU session based on the AMF request. The AGF may receive, from the AMF and based on the PDU session establishment request, a PDU session resource setup request that requests a resource to be established for the PDU session. As indicated by step number 5, the AGF may provide, to the AMF and based on the PDU session resource setup request, a PDU session resource setup response indicating that the resource is a GTP tunnel. As further shown, the AMF may request that the SMF modify the PDU session, and the UPF and the SMF may modify the PDU session based on the AMF request.

As shown in FIG. 1C, and by reference number 110, the AGF and the UPF may establish the GTP tunnel requested by the PDU session resource setup request. As indicated by step number 6, the AGF may provide, to the FN-RG, a DHCP offer that offers utilization of the AGF as a DHCP server. The FN-RG may generate a DHCP request that requests utilization of the AGF as the DHCP server, and may provide the DHCP request to the AN. The AN may append the identifier of the FN-RG (e.g., a line ID) to the DHCP request, and may provide the DHCP request to the AGF. As indicated by step number 7, the AGF may provide, to the FN-RG, a DHCP acknowledgement (ACK) that acknowledges utilization of the AGF as the DHCP server by the FN-RG.

As further shown in FIG. 1C, the AGF may receive, from the FN-RG and based on the DHCP offer, an address resolution protocol (ARP) request that requests an address of the AGF (e.g., a gateway IP address). The AGF may provide, to the FN-RG and based on the ARP request, an ARP response that includes the address of the AGF. An IP version 4 (IPv4) address may be assigned to the FN-RG, and the AGF may map the address (e.g., an IPv4 address) of the AGF to the PDU session identifier based on the ARP response. As further shown, the AGF may enable data packets to be provided from the customer premises equipment to the data network, via the GTP tunnel, based on mapping the address of the AGF to the PDU session identifier.

Figure 1D:
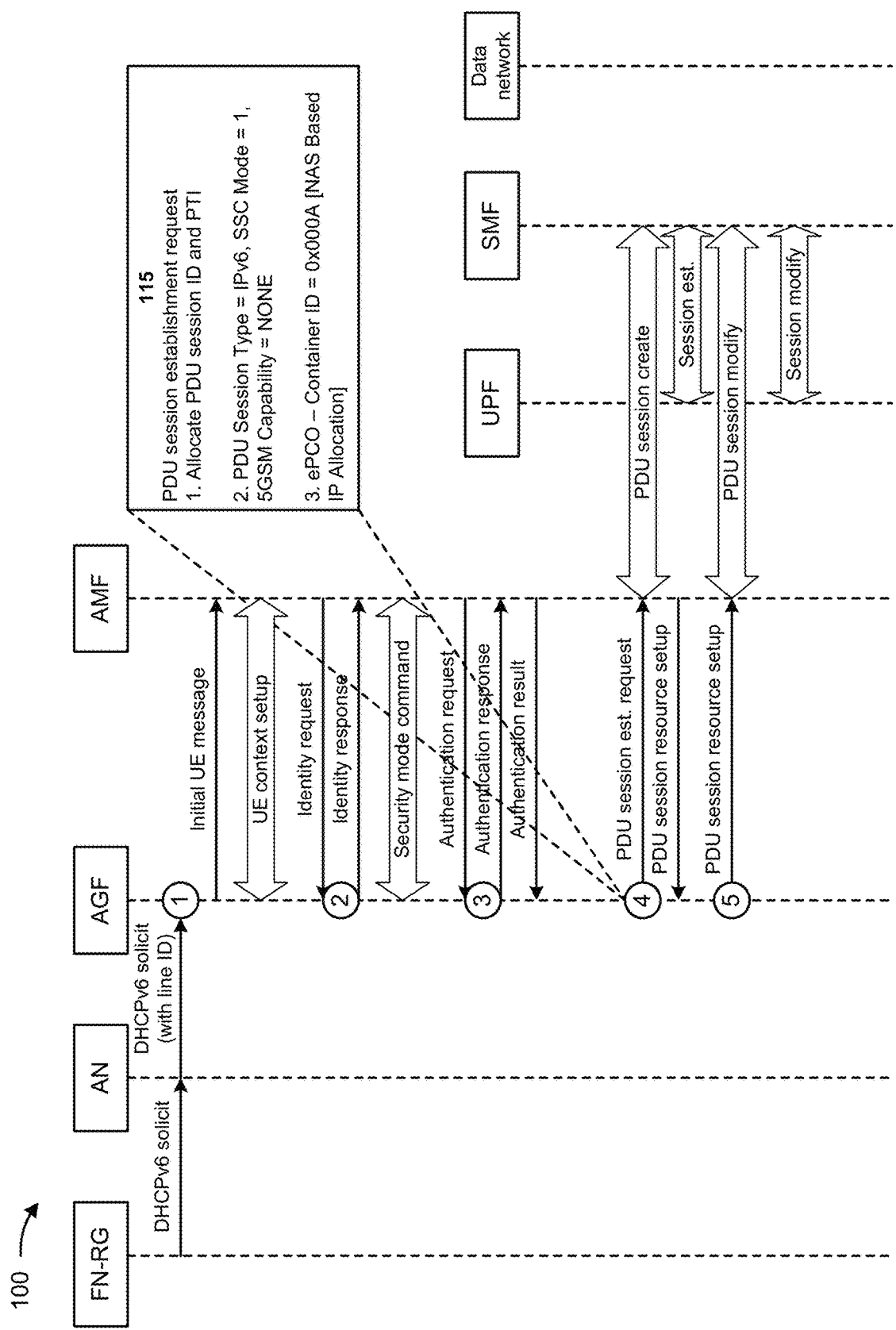
Figure 1E:
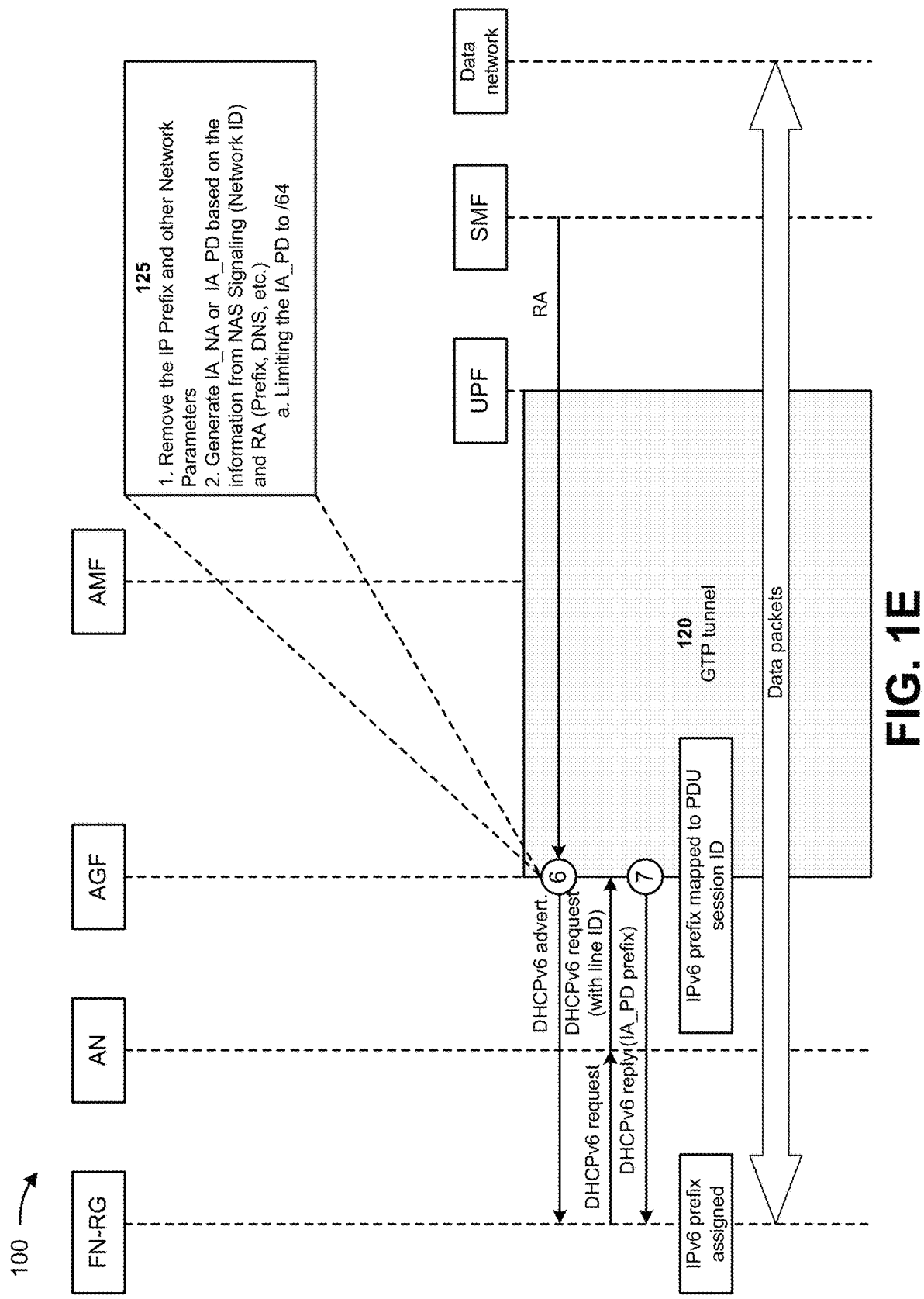

FIGS. 1D and 1E depict a call flow diagram for an Internet protocol version 6 stateless address autoconfiguration (SLAAC) packet flow. As shown in FIG. 1D, the FN-RG may generate a DHCP solicit request that requests identification of a DHCP server (e.g., the AGF), and may provide the DHCP solicit request to the AN. The AN may append the identifier of the FN-RG (e.g., the line ID) to the DHCP solicit request, and may provide the DHCP solicit request to the AGF. As indicated by step number 1, the AGF may receive, from the AN, the DHCP solicit request that includes the identifier of the FN-RG. The AGF may provide, to the AMF and based on the DHCP solicit request, an initial UE message that requests registration of the AGF. As further shown, the AGF and the AMF may perform UE context setup to aid in the registration of the AGF.

As indicated by step number 2, the AGF may receive, from the AMF and based on the DHCP solicit request, an identity request that requests identification of the AGF. As further indicated by step number 2, the AGF may provide, to the AMF and based on the identity request, an identity response that includes the identification of the AGF. The identification of the AGF may include a network address associated with the AGF. The AGF and the AMF may utilize security mode commands to aid in the registration of the AGF.

As indicated by step number 3, the AGF may receive, from the AMF and based on the identity response, an authentication request that requests authentication of the AGF. As further indicated by step number 3, the AGF may provide, to the AMF and based on the authentication request, an authentication response that includes the authentication of AGF. The AMF may receive the authentication response and may determine whether to authenticate the AGF. If the AMF authenticates the AGF, the AMF may provide, to the AGF, an authentication result indicating that the AGF is authenticated.

As indicated by step number 4, the AGF may provide, to the AMF and based on the authentication response and/or the registration complete message, a PDU session establishment request that requests establishment of a PDU session for the FN-RG. For example, as indicated by reference number 115, the PDU session establishment request may include data requesting allocation of a PDU session identifier and a PTI, data identifying a PDU session type (e.g., IP version 6, with a SSC mode, and no 5GSM capability), data identifying an ePCO with a container identifier (e.g., "0x000A") of a NAS-based IP allocation, and/or the like.

As further shown in FIG. 1D, the AMF may request that the SMF create the PDU session, and the UPF and the SMF may establish the PDU session based on the AMF request. The AGF may receive, from the AMF and based on the PDU session establishment request, a PDU session resource setup request that requests a resource to be established for the PDU session. As indicated by step number 5, the AGF may provide, to the AMF and based on the PDU session resource setup request, a PDU session resource setup response indicating that the resource is a GTP tunnel. As further shown, the AMF may request that the SMF modify the PDU session, and the UPF and the SMF may modify the PDU session based on the AMF request.

As shown in FIG. 1E, and by reference number 120, the AGF and the UPF may establish the GTP tunnel requested by the PDU session resource setup request. The AGF may receive, from the SMF and when the PDU session type is an IP version 6 PDU session type, a router advertisement that includes an IP prefix and network parameters. The router advertisement may be associated with stateless address autoconfiguration. As indicated by step number 6 and reference number 125, the AGF may remove the IP prefix and the network parameters from the router advertisement, and generate an identity association for non-temporary addresses (IA_NA) or an identity association for prefix delegation (IA_PD) prefix based on the router advertisement. The AGF may generate the IA_NA or the IA_PD based on information from NAS signaling (e.g., a network identifier), the router advertisement (e.g., a prefix, a domain name service, and/or the like), and/or the like.

As further indicated by step number 6, the AGF may provide, to the FN-RG, a DHCP advertisement based on the IA_PD prefix. The DHCP advertisement may offer utilization of the AGF as a DHCP server. The FN-RG may generate a DHCP request that requests IA_PD prefix, and may provide the DHCP request to the AN. The AN may append the identifier of the FN-RG (e.g., a line ID) to the DHCP request, and may provide the DHCP request to the AGF. As indicated by step number 7, the AGF may provide, to the FN-RG and based on the DHCP request, a DHCP reply that includes the IA_PD prefix. The IA_PD prefix may be mapped to the FN-RG, and the AGF may map the IA_PD prefix to the PDU session identifier based on the DHCP reply. The AGF may enable data packets to be provided from the FN-RG to the data network, via the GTP tunnel, based on mapping the IA_PD prefix to the PDU session identifier.

FIG. 1F depicts a call flow diagram for an Internet protocol version 6 IA_NA packet flow. Although not shown in FIG. 1F, the call flow may include step numbers 1-5 depicted in FIG. 1D and described above. As indicated by step number 6, the AGF may receive, from the SMF and when the PDU session type is an Internet protocol version 6 PDU session type, a DHCP exchange that includes the IA_NA. As further indicated by step number 6, the AGF may provide, to the FN-RG, a DHCP advertisement based on the IA_NA. The FN-RG may generate a DHCP request that requests IA_NA, and may provide the DHCP request to the AN. The AN may append the identifier of the FN-RG (e.g., a line ID) to the DHCP request, and may provide the DHCP request to the AGF. As indicated by step number 7, the AGF may provide, to the FN-RG and based on the DHCP request, a DHCP reply that includes the IA_NA. The IA_NA may be assigned to the FN-RG, and the AGF may map the IA_NA to the PDU session identifier based on the DHCP reply. The AGF may enable the data packets to be provided from the FN-RG to the data network, via the GTP tunnel, based on mapping the IA_NA to the PDU session identifier.

In this way, the AGF supports DHCP-based customer premises equipment in 5G wireline and wireless convergence. The AGF may reduce overhead both in the AGF and a network provided between the AGF and the SMF (e.g., via the UPF). The AGF may establish and utilize a NAS signaling method for allocation of an IP address for the FN-RG and may serve the FN-RG with the IP address and network parameters allocated by the 5GCP. In addition, a lease time for the IP address may be configurable to a short duration. This, in turn, conserves computing resources, networking resources, and/or the like that would otherwise have been wasted in performing deep packet inspection, transmitting DHCP packets to the SMF via the UPF, encapsulating and/or decapsulating DHCP packets, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
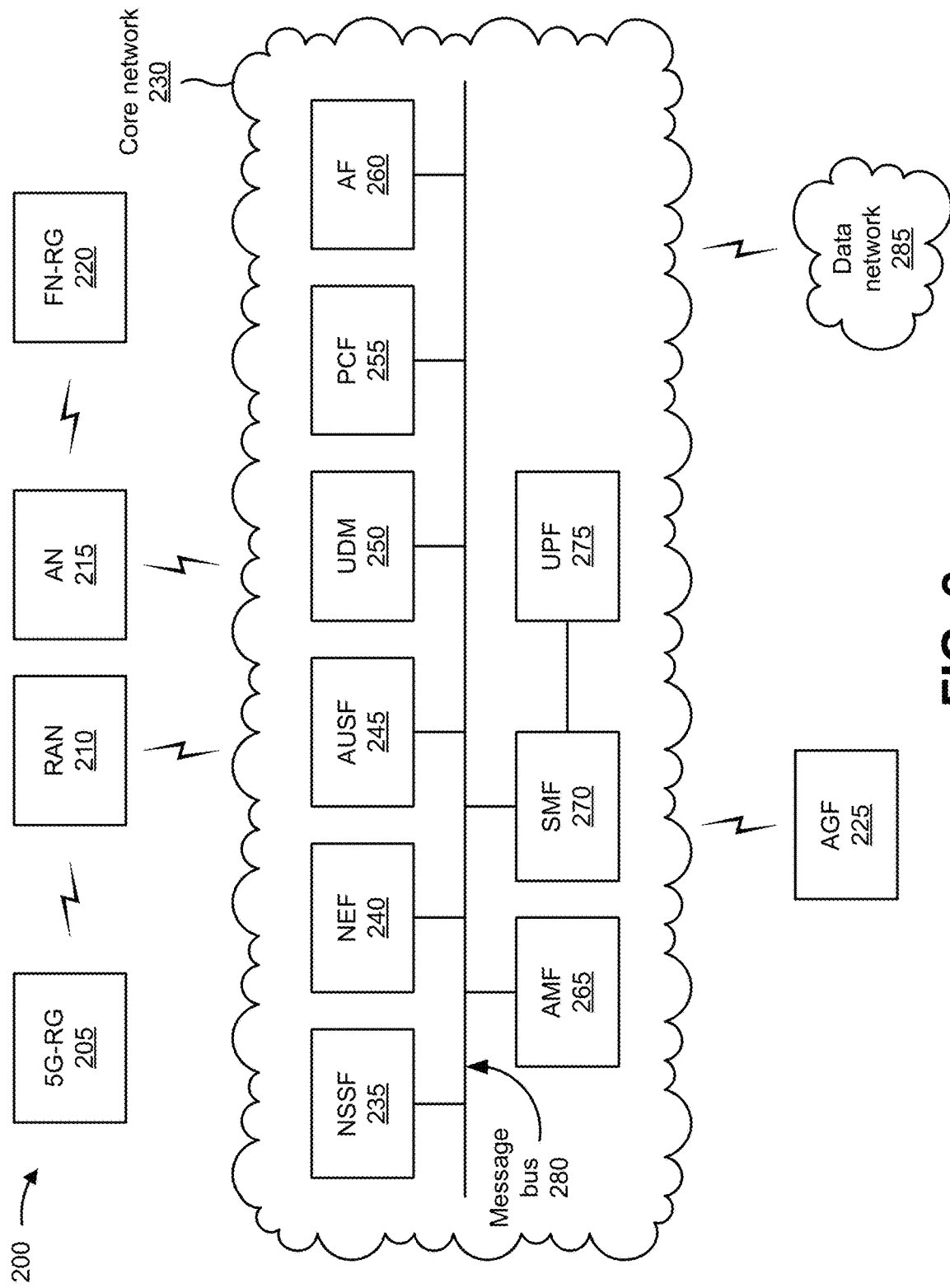
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a 5G-RG 205, a RAN 210, an access node (AN) 215, a FN-RG 220, an AGF 225, a core network 230, and a data network 285. Devices and/or networks of example environment 200 may interconnect via wired connections, wireless connections, or a combination of wired and wireless connections.

5G-RG 205 includes a device capable of receiving, generating, storing, processing, and/or providing information, such as information described herein. For example, 5G-RG 205 may include a device that combines a 5G modem and a Wi-Fi router into a single device, rather than using separate devices connected via cabling.

RAN 210 may support, for example, a cellular radio access technology (RAT). RAN 210 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for 5G-RG 205. RAN 210 may transfer traffic between 5G-RG 205 (e.g., using a cellular RAT), one or more base stations (e.g., using a wireless interface or a backhaul interface, such as a wired backhaul interface), and/or core network 230. RAN 210 may provide one or more cells that cover geographic areas.

In some implementations, RAN 210 may perform scheduling and/or resource management for 5G-RG 205 covered by RAN 210 (e.g., 5G-RG 205 covered by a cell provided by RAN 210). In some implementations, RAN 210 may be controlled or coordinated by a network controller, which may perform load balancing, network-level configuration, and/or the like. The network controller may communicate with RAN 210 via a wireless or wireline backhaul. In some implementations, RAN 210 may include a network controller, a self-organizing network (SON) module or component, or a similar module or component. In other words, RAN 210 may perform network control, scheduling, and/or network management functions (e.g., for uplink, downlink, and/or sidelink communications of 5G-RG 205 covered by RAN 210).

AN 215 includes a device capable of receiving, generating, storing, processing, and/or providing information, such as information described herein. For example, AN 215 may include a network device (e.g., a switch) that is located at a meeting point between two networks (e.g., a customer premises LAN and core network 230).

FN-RG 220 includes a device capable of receiving, generating, storing, processing, and/or providing information, such as information described herein. For example, FN-RG 220 may include a router that provides network access between local area network (LAN) hosts to a wide area network (WAN) (e.g., the Internet) via a modem. The modem may or may not be integrated into the hardware of FN-RG 220. The WAN may be a larger computer network, generally operated by an Internet service provider.

AGF 225 includes a device capable of receiving, generating, storing, processing, and/or providing information, such as information described herein. For example, AGF 225 may provide authentication, authorization, and accounting (AAA) services plus hierarchical traffic shaping and policing for 5G-RG 205 and FN-RG 220 served from UPF 275 within core network 230. While policy and subscriber databases are distinct elements in wireline broadband networks, the adoption of a 5G service based architecture (SBA) enables resources, such as a policy control function (PCF) 255 and an authentication server function (AUSF) 275 to be shared across mobile, fixed wireless, and wireline access networks. The 5G SBA also supports shared supporting infrastructure, such as an IP multimedia Sussystem (IMS) for rich multimedia service delivery.

In some implementations, core network 230 may include an example functional architecture in which systems and/or methods described herein may be implemented. For example, core network 230 may include an example architecture of a fifth generation (5G) next generation (NG) core network included in a 5G wireless telecommunications system. While the example architecture of core network 230 shown in FIG. 2 may be an example of a service-based architecture, in some implementations, core network 230 may be implemented as a reference-point architecture, a 4G core network, and/or the like.

As shown in FIG. 2, core network 230 may include a number of functional elements. The functional elements may include, for example, a network slice selection function (NSSF) 235, a network exposure function (NEF) 240, an authentication server function (AUSF) 245, a unified data management (UDM) component 250, a policy control function (PCF) 255, an application function (AF) 260, an access and mobility management function (AMF) 265, a session management function (SMF) 270, a user plane function (UPF) 275, and/or the like. These functional elements may be communicatively connected via a message bus 280. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 235 includes one or more devices that select network slice instances for 5G-RG 205. By providing network slicing, NSSF 235 allows an operator to deploy multiple substantially independent end-to-end networks potentially with the same infrastructure. In some implementations, each slice may be customized for different services.

NEF 240 includes one or more devices that support exposure of capabilities and/or events in the wireless telecommunications system to help other entities in the wireless telecommunications system discover network services.

AUSF 245 includes one or more devices that act as an authentication server and support the process of authenticating 5G-RG 205 in the wireless telecommunications system.

UDM 250 includes one or more devices that store user data and profiles in the wireless telecommunications system. UDM 250 may be used for fixed access, mobile access, and/or the like, in core network 230.

PCF 255 includes one or more devices that provide a policy framework that incorporates network slicing, roaming, packet processing, mobility management, and/or the like.

AF 260 includes one or more devices that support application influence on traffic routing, access to NEF 240, policy control, and/or the like.

AMF 265 includes one or more devices that act as a termination point for non-access stratum (NAS) signaling, mobility management, and/or the like.

SMF 270 includes one or more devices that support the establishment, modification, and release of communication sessions in the wireless telecommunications system. For example, SMF 270 may configure traffic steering policies at UPF 275, enforce user equipment IP address allocation and policies, and/or the like.

UPF 275 includes one or more devices that serve as an anchor point for intraRAT and/or interRAT mobility. UPF 275 may apply rules to packets, such as rules pertaining to packet routing, traffic reporting, handling user plane QoS, and/or the like.

Message bus 280 represents a communication structure for communication among the functional elements. In other words, message bus 280 may permit communication between two or more functional elements.

Data network 285 includes one or more wired and/or wireless data networks. For example, data network 285 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
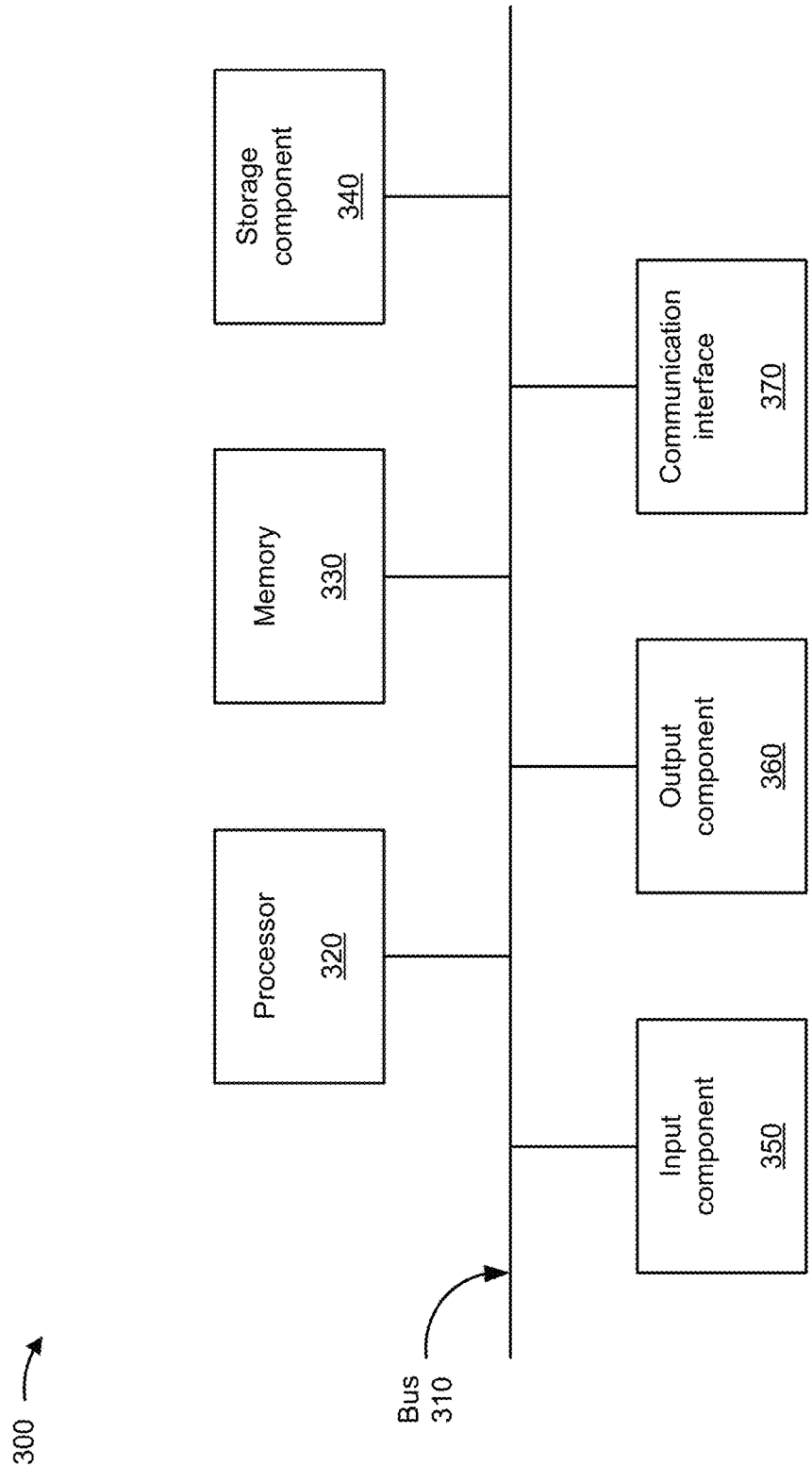
FIG. 3 is a diagram of example components of one or more devices of FIG. 2.

FIG. 3 is a diagram of example components of a device 300, which may correspond to 5G-RG 205, AN 215, FN-RG 220, AGF 225, NSSF 235, NEF 240, AUSF 245, UDM 250, PCF 255, AF 260, AMF 265, SMF 270, and/or UPF 275. In some implementations, 5G-RG 205, AN 215, FN-RG 220, AGF 225, NSSF 235, NEF 240, AUSF 245, UDM 250, PCF 255, AF 260, AMF 265, SMF 270, and/or UPF 275 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for supporting DHCP-based customer premises equipment in 5G wireline and wireless convergence. In some implementations, one or more process blocks of FIG. 4 may be performed by a device (e.g., AGF 225). In some implementations, one or more process blocks of FIG. 4 may be performed by another device or a group of devices separate from or including the device, such as an AMF (e.g., AMF 265), an SMF (e.g., SMF 270), and/or a UPF (e.g., UPF 275). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from customer premises equipment, a dynamic host configuration protocol (DHCP) discover request that includes an identifier of the customer premises equipment (block 410). For example, the device may receive, from customer premises equipment, a dynamic host configuration protocol (DHCP) discover request that includes an identifier of the customer premises equipment, as described above.

As further shown in FIG. 4, process 400 may include receiving, from a first network device and based on the DHCP discover request, an identity request that requests identification of the device (block 420). For example, the device may receive, from a first network device and based on the DHCP discover request, an identity request that requests identification of the device, as described above.

As further shown in FIG. 4, process 400 may include providing, to the first network device and based on the identity request, an identity response that includes the identification of the device (block 430). For example, the device may provide, to the first network device and based on the identity request, an identity response that includes the identification of the device, as described above.

As further shown in FIG. 4, process 400 may include receiving, from the first network device and based on the identity response, an authentication request that requests authentication of the device (block 440). For example, the device may receive, from the first network device and based on the identity response, an authentication request that requests authentication of the device, as described above.

As further shown in FIG. 4, process 400 may include providing, to the first network device and based on the authentication request, an authentication response that includes the authentication of the device (block 450). For example, the device may provide, to the first network device and based on the authentication request, an authentication response that includes the authentication of the device, as described above.

As further shown in FIG. 4, process 400 may include providing, to the first network device and based on the authentication response, a protocol data unit (PDU) session establishment request that requests establishment of a PDU session for the customer premises equipment, wherein the PDU session establishment request includes data requesting allocation of a PDU session identifier and a procedure transaction identity (PTI), data identifying a PDU session type, and data identifying an extended protocol configuration option with a container identifier of non-access stratum-based IP allocation (block 460). For example, the device may provide, to the first network device and based on the authentication response, a PDU session establishment request that requests establishment of a PDU session for the customer premises equipment, as described above. In some implementations, the PDU session establishment request includes data requesting allocation of a PDU session identifier and a PTI, data identifying a PDU session type, and data identifying an extended protocol configuration option with a container identifier of non-access stratum-based IP allocation.

As further shown in FIG. 4, process 400 may include receiving, from the first network device and based on the PDU session establishment request, a PDU session resource setup request that requests a resource to be established for the PDU session (block 470). For example, the device may receive, from the first network device and based on the PDU session establishment request, a PDU session resource setup request that requests a resource to be established for the PDU session, as described above.

As further shown in FIG. 4, process 400 may include providing, to the first network device and based on the PDU session resource setup request, a PDU session resource setup response indicating that the resource is a general packet radio service (GPRS) tunneling protocol (GTP) tunnel (block 480). For example, the device may provide, to the first network device and based on the PDU session resource setup request, a PDU session resource setup response indicating that the resource is a GTP tunnel, as described above.

As further shown in FIG. 4, process 400 may include establishing, based on the PDU session resource setup response, the GTP tunnel with a second network device (block 490). For example, the device may establish, based on the PDU session resource setup response, the GTP tunnel with a second network device, as described above.

Process 400 may include additional implementations, such as any single implementation or any combination of implementations described below and/or in connection with one or more other processes described elsewhere herein.

In a first implementation, process 400 includes providing, to the customer premises equipment, a DHCP offer that offers utilization of the device as a DHCP server; receiving, from the customer premises equipment and based on the DHCP offer, an address resolution protocol (ARP) request that requests an address of the device; providing, to the customer premises equipment and based on the ARP request, an ARP response that includes the address of the device; mapping the address of the device to the PDU session identifier based on the ARP response; and enabling data packets to be provided from the customer premises equipment to a data network, via the GTP tunnel, based on mapping the address of the device to the PDU session identifier.

In a second implementation, alone or in combination with the first implementation, the PDU session type is an Internet protocol version 4 PDU session type.

In a third implementation, alone or in combination with one or more of the first and second implementations, process 400 includes receiving, from a third network device and when the PDU session type is an Internet protocol (IP) version 6 PDU session type, a router advertisement that includes an IP prefix and network parameters; removing the IP prefix and the network parameters from the router advertisement; generating an identity association for prefix delegation (IA_PD) prefix based on the router advertisement; providing, to the customer premises equipment, a DHCP advertisement based on the IA_PD prefix; receiving, from the customer premises equipment and based on the DHCP advertisement, a DHCP request that requests the IA_PD prefix; providing, to the customer premises equipment and based on the DHCP request, a DHCP reply that includes the IA_PD prefix; mapping the IA_PD prefix to the PDU session identifier based on the DHCP reply; and enabling data packets to be provided from the customer premises equipment to a data network, via the GTP tunnel, based on mapping the IA_PD prefix to the PDU session identifier.

In a fourth implementation, alone or in combination with one or more of the first through third implementations, the third network device includes a session management function.

In a fifth implementation, alone or in combination with one or more of the first through fourth implementations, the IA_PD prefix is assigned to the customer premises equipment.

In a sixth implementation, alone or in combination with one or more of the first through fifth implementations, the router advertisement is associated with stateless address autoconfiguration.

In a seventh implementation, alone or in combination with one or more of the first through sixth implementations, process 400 includes receiving, from a third network device and when the PDU session type is an Internet protocol version 6 PDU session type, a DHCP exchange that includes an identity association for prefix delegation (IA_PD) prefix; providing, to the customer premises equipment, a DHCP advertisement based on the IA_PD prefix; receiving, from the customer premises equipment and based on the DHCP advertisement, a DHCP request that requests the IA_PD prefix; providing, to the customer premises equipment and based on the DHCP request, a DHCP reply that includes the IA_PD prefix; mapping the IA_PD prefix to the PDU session identifier based on the DHCP reply; and enabling the data packets to be provided from the customer premises equipment to the data network, via the GTP tunnel, based on mapping the IA_PD prefix to the PDU session identifier.

In an eighth implementation, alone or in combination with one or more of the first through seventh implementations, process 400 includes receiving, from a third network device and when the PDU session type is an Internet protocol version 6 PDU session type, a DHCP exchange that includes an identity association for non-temporary addresses (IA_NA); providing, to the customer premises equipment, a DHCP advertisement based on the IA_NA; receiving, from the customer premises equipment and based on the DHCP advertisement, a DHCP request that requests the IA_NA; providing, to the customer premises equipment and based on the DHCP request, a DHCP reply that includes the IA_NA, mapping the IA_NA to the PDU session identifier based on the DHCP reply; and enabling the data packets to be provided from the customer premises equipment to the data network, via the GTP tunnel, based on mapping the IA_NA to the PDU session identifier.

In a ninth implementation, alone or in combination with one or more of the first through eighth implementations, the IA_NA is assigned to the customer premises equipment.

In a tenth implementation, alone or in combination with one or more of the first through ninth implementations, process 400 includes receiving, from a third network device and when the PDU session type is an Internet protocol (IP) version 6 PDU session type, a router advertisement; providing the router advertisement to the customer premises equipment; and enabling the data packets to be provided from the customer premises equipment to the data network, via the GTP tunnel, based on providing the router advertisement to the customer premises equipment.

In an eleventh implementation, alone or in combination with one or more of the first through tenth implementations, the router advertisement is associated with stateless address autoconfiguration.

In a twelfth implementation, alone or in combination with one or more of the first through eleventh implementations, the device includes an access gateway function, the customer premises equipment includes a residential gateway, the first network device includes an access and mobility management function, and the second network device include a user plane function.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from customer premises equipment, a dynamic host configuration protocol (DHCP) discover request that includes an identifier of the customer premises equipment;
   receiving, by the device, from a first network device, and based on the DHCP discover request, an identity request that requests identification of the device;
   providing, by the device, to the first network device, and based on the identity request, an identity response that includes the identification of the device;
   receiving, by the device, from the first network device, and based on the identity response, an authentication request that requests authentication of the device;
   providing, by the device, to the first network device, and based on the authentication request, an authentication response that includes the authentication of the device;
   providing, by the device, to the first network device, and based on the authentication response, a protocol data unit (PDU) session establishment request that requests establishment of a PDU session for the customer premises equipment,
  wherein the PDU session establishment request includes:
    data requesting allocation of a PDU session identifier and a procedure transaction identity (PTI),
    data identifying a PDU session type, and
    data identifying an extended protocol configuration option with a container identifier of non-access stratum-based IP allocation;
receiving, by the device, from the first network device, and based on the PDU session establishment request, a PDU session resource setup request that requests a resource to be established for the PDU session;
providing, by the device, to the first network device, and based on the PDU session resource setup request, a PDU session resource setup response indicating that the resource is a general packet radio service (GPRS) tunneling protocol (GTP) tunnel; and
establishing, by the device and based on the PDU session resource setup response, the GTP tunnel with a second network device.

2. The method of claim 1, further comprising:
providing, to the customer premises equipment, a DHCP offer that offers utilization of the device as a DHCP server;
receiving, from the customer premises equipment and based on the DHCP offer, an address resolution protocol (ARP) request that requests an address of the device;
providing, to the customer premises equipment and based on the ARP request, an ARP response that includes the address of the device;
mapping the address of the device to the PDU session identifier based on the ARP response; and
enabling data packets to be provided from the customer premises equipment to a data network, via the GTP tunnel, based on mapping the address of the device to the PDU session identifier.

3. The method of claim 1, wherein the PDU session type is an Internet protocol version 4 PDU session type.

4. The method of claim 1, further comprising:
receiving, from a third network device and when the PDU session type is an Internet protocol (IP) version 6 PDU session type, a router advertisement that includes an IP prefix and network parameters;
removing the IP prefix and the network parameters from the router advertisement;
generating an identity association for prefix delegation (IA_PD) prefix based on the router advertisement;
providing, to the customer premises equipment, a DHCP advertisement based on the IA_PD prefix;
receiving, from the customer premises equipment and based on the DHCP advertisement, a DHCP request that requests the IA_PD prefix;
providing, to the customer premises equipment and based on the DHCP request, a DHCP reply that includes the IA_PD prefix;
mapping the IA_PD prefix to the PDU session identifier based on the DHCP reply; and
enabling data packets to be provided from the customer premises equipment to a data network, via the GTP tunnel, based on mapping the IA_PD prefix to the PDU session identifier.

5. The method of claim 4, wherein the third network device includes a session management function.

6. The method of claim 4, wherein the IA_PD prefix is assigned to the customer premises equipment.

7. The method of claim 4, wherein the router advertisement is associated with stateless address autoconfiguration.

8. A device, comprising:
one or more memories; and
one or more processors to:
  receive, from customer premises equipment, a dynamic host configuration protocol (DHCP) discover request that includes an identifier of the customer premises equipment;
  receive, from a first network device and based on the DHCP discover request, an identity request that requests identification of the device;
  provide, to the first network device and based on the identity request, an identity response that includes the identification of the device;
  receive, from the first network device and based on the identity response, an authentication request that requests authentication of the device;
  provide, to the first network device and based on the authentication request, an authentication response that includes the authentication of the device;
  provide, to the first network device and based on the authentication response, a protocol data unit (PDU) session establishment request that requests establishment of a PDU session for the customer premises equipment,
    wherein the PDU session establishment request includes:
      data requesting allocation of a PDU session identifier and a procedure transaction identity (PTI),
      data identifying a PDU session type, and
      data identifying an extended protocol configuration option with a container identifier of non-access stratum-based IP allocation;
  receive, from the first network device and based on the PDU session establishment request, a PDU session resource setup request that requests a resource to be established for the PDU session;
  provide, to the first network device and based on the PDU session resource setup request, a PDU session resource setup response indicating that the resource is a general packet radio service (GPRS) tunneling protocol (GTP) tunnel;
  establish, based on the PDU session resource setup response, the GTP tunnel with a second network device; and
  enable data packets to be provided from the customer premises equipment to a data network via the GTP tunnel.

9. The device of claim 8, wherein the one or more processors are further to:
receive, from a third network device and when the PDU session type is an Internet protocol version 6 PDU session type, a DHCP exchange that includes an identity association for prefix delegation (IA_PD) prefix;
provide, to the customer premises equipment, a DHCP advertisement based on the IA_PD prefix;
receive, from the customer premises equipment and based on the DHCP advertisement, a DHCP request that requests the IA_PD prefix;
provide, to the customer premises equipment and based on the DHCP request, a DHCP reply that includes the IA_PD prefix;
map the IA_PD prefix to the PDU session identifier based on the DHCP reply; and enable the data packets to be provided from the customer premises equipment to the data network, via the GTP tunnel, based on mapping the IA_PD prefix to the PDU session identifier.

10. The device of claim 8, wherein the one or more processors are further to:
receive, from a third network device and when the PDU session type is an Internet protocol version 6 PDU session type, a DHCP exchange that includes an identity association for non-temporary addresses (IA_NA);
provide, to the customer premises equipment, a DHCP advertisement based on the IA_NA;
receive, from the customer premises equipment and based on the DHCP advertisement, a DHCP request that requests the IA_NA;
provide, to the customer premises equipment and based on the DHCP request, a DHCP reply that includes the IA_NA;
map the IA_NA to the PDU session identifier based on the DHCP reply; and
enable the data packets to be provided from the customer premises equipment to the data network, via the GTP tunnel, based on mapping the IA_NA to the PDU session identifier.

11. The device of claim 10, wherein the IA_NA is assigned to the customer premises equipment.

12. The device of claim 8, wherein the one or more processors are further to:
receive, from a third network device and when the PDU session type is an Internet protocol (IP) version 6 PDU session type, a router advertisement;
provide the router advertisement to the customer premises equipment; and
enable the data packets to be provided from the customer premises equipment to the data network, via the GTP tunnel, based on providing the router advertisement to the customer premises equipment.

13. The device of claim 12, wherein the router advertisement is associated with stateless address autoconfiguration.

14. The device of claim 8, wherein:
the device includes an access gateway function,
the customer premises equipment includes a residential gateway,
the first network device includes an access and mobility management function, and
the second network device include a user plane function.

15. A non-transitory computer-readable medium storing a set of instructions, the set of instructions comprising:
one or more instructions that, when executed by one or more processors of a device, cause the device to:
receive, from a first network device and based on a dynamic host configuration protocol (DHCP) discover request received from customer premises equipment, an identity request that requests identification of the device;
provide, to the first network device and based on the identity request, an identity response that includes the identification of the device;
receive, from the first network device and based on the identity response, an authentication request that requests authentication of the device;
provide, to the first network device and based on the authentication request, an authentication response that includes the authentication of the device;
provide, to the first network device and based on the authentication response, a protocol data unit (PDU) session establishment request that requests establishment of a PDU session for the customer premises equipment,
wherein the PDU session establishment request includes:
data requesting allocation of a PDU session identifier and a procedure transaction identity (PTI),
data identifying a PDU session type, and
data identifying an extended protocol configuration option with a container identifier of non-access stratum-based IP allocation;
receive, from the first network device and based on the PDU session establishment request, a PDU session resource setup request that requests a resource to be established for the PDU session;
provide, to the first network device and based on the PDU session resource setup request, a PDU session resource setup response indicating that the resource is a general packet radio service (GPRS) tunneling protocol (GTP) tunnel; and
establish, based on the PDU session resource setup response, the GTP tunnel with a second network device.

16. The non-transitory computer-readable medium of claim 15, wherein the one or more instructions further cause the device to:
provide, to the customer premises equipment, a DHCP offer that offers utilization of the device as a DHCP server;
receive, from the customer premises equipment and based on the DHCP offer, an address resolution protocol (ARP) request that requests an address of the device;
provide, to the customer premises equipment and based on the ARP request, an ARP response that includes the address of the device;
map the address of the device to the PDU session identifier based on the ARP response; and
enable data packets to be provided from the customer premises equipment to a data network, via the GTP tunnel, based on mapping the address of the device to the PDU session identifier.

17. The non-transitory computer-readable medium of claim 15, wherein the one or more instructions further cause the device to:
receive, from a third network device and when the PDU session type is an Internet protocol (IP) version 6 PDU session type, a router advertisement that includes an IP prefix and network parameters;
remove the IP prefix and the network parameters from the router advertisement;
generate an identity association for prefix delegation (IA_PD) prefix based on the router advertisement;
provide, to the customer premises equipment, a DHCP advertisement based on the IA_PD prefix;
receive, from the customer premises equipment and based on the DHCP advertisement, a DHCP request that requests the IA_PD prefix;
provide, to the customer premises equipment and based on the DHCP request, a DHCP reply that includes the IA_PD prefix;
map the IA_PD prefix to the PDU session identifier based on the DHCP reply; and
enable data packets to be provided from the customer premises equipment to a data network, via the GTP tunnel, based on mapping the IA_PD prefix to the PDU session identifier.

18. The non-transitory computer-readable medium of claim 15, wherein the one or more instructions further cause the device to:
- receive, from a third network device and when the PDU session type is an Internet protocol version 6 PDU session type, a DHCP exchange that includes an identity association for prefix delegation (IA_PD) prefix;
- provide, to the customer premises equipment, a DHCP advertisement based on the IA_PD prefix;
- receive, from the customer premises equipment and based on the DHCP advertisement, a DHCP request that requests the IA_PD prefix;
- provide, to the customer premises equipment and based on the DHCP request, a DHCP reply that includes the IA_PD prefix;
- map the IA_PD prefix to the PDU session identifier based on the DHCP reply; and
- enable data packets to be provided from the customer premises equipment to a data network, via the GTP tunnel, based on mapping the IA_PD prefix to the PDU session identifier.

19. The non-transitory computer-readable medium of claim 15, wherein the one or more instructions further cause the device to:
- receive, from a third network device and when the PDU session type is an Internet protocol version 6 PDU session type, a DHCP exchange that includes an identity association for non-temporary addresses (IA_NA);
- provide, to the customer premises equipment, a DHCP advertisement based on the IA_NA;
- receive, from the customer premises equipment and based on the DHCP advertisement, a DHCP request that requests the IA_NA;
- provide, to the customer premises equipment and based on the DHCP request, a DHCP reply that includes the IA_NA;
- map the IA_NA to the PDU session identifier based on the DHCP reply; and
- enable data packets to be provided from the customer premises equipment to a data network, via the GTP tunnel, based on mapping the IA_NA to the PDU session identifier.

20. The non-transitory computer-readable medium of claim 15, wherein the one or more instructions further cause the device to:
- receive, from a third network device and when the PDU session type is an Internet protocol (IP) version 6 PDU session type, a router advertisement;
- provide the router advertisement to the customer premises equipment; and
- enable data packets to be provided from the customer premises equipment to a data network, via the GTP tunnel, based on providing the router advertisement to the customer premises equipment.

* * * * *